US011808588B2

(12) United States Patent
Marco

(10) Patent No.: US 11,808,588 B2
(45) Date of Patent: Nov. 7, 2023

(54) NAVIGATING DRIVERS TO DYNAMICALLY SELECTED DROP-OFF LOCATIONS FOR SHARED RIDES

(71) Applicant: Lyft, Inc., San Francisco, CA (US)

(72) Inventor: Talmon Marco, Tel Aviv (IL)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 17/338,324

(22) Filed: Jun. 3, 2021

(65) Prior Publication Data
US 2021/0318127 A1    Oct. 14, 2021

Related U.S. Application Data

(63) Continuation of application No. 16/596,176, filed on Oct. 8, 2019, now Pat. No. 11,035,683, which is a
(Continued)

(51) Int. Cl.
*G01C 21/34*    (2006.01)
*G08G 1/00*    (2006.01)
(Continued)

(52) U.S. Cl.
CPC ......... *G01C 21/3438* (2013.01); *G01C 21/34* (2013.01); *G01C 21/3611* (2013.01);
(Continued)

(58) Field of Classification Search
CPC ............... G01C 21/3438; G01C 21/34; G01C 21/3611; G06Q 10/025; G06Q 10/04;
(Continued)

(56) References Cited

U.S. PATENT DOCUMENTS 9,651,391 B1 * 5/2017 Hayes .................... G06Q 50/01
10,169,804 B2   1/2019 Thangaraj et al.
(Continued)

FOREIGN PATENT DOCUMENTS

WO    WO-2016025926 A1 *  2/2016    ....... G06Q 10/08355

OTHER PUBLICATIONS

The Extended European Search Report for EP Application No. EP18177094.2-1222, dated Aug. 7, 2018, 8 pages.
(Continued)

*Primary Examiner* — Rodney A Butler
(74) *Attorney, Agent, or Firm* — Keller Preece PLLC

(57) ABSTRACT

A method includes transmitting, to a driver computing device associated with a driver, navigational data to direct the driver to a first pick-up location and to direct the driver from the first pick-up location to a first drop-off location along a first route to fulfill a first transportation request associated with a first user. The method further includes determining that the first route is to be modified, identifying a drop-off area associated with the first drop-off location, and selecting a second drop-off location and a second route for the first user. The first drop-off location and the second drop-off location are located within the drop-off area. The method further includes transmitting, to the driver computing device, updated navigational data to direct the driver to the second drop-off location along the second route to fulfill the first transportation request.

20 Claims, 5 Drawing Sheets

Related U.S. Application Data continuation of application No. 15/620,903, filed on Jun. 13, 2017, now Pat. No. 10,458,802.

(51) Int. Cl.

| | | |
|---|---|---|
| *G06Q 10/04* | (2023.01) | |
| *G06Q 50/30* | (2012.01) | |
| *G06Q 10/02* | (2012.01) | |
| *H04W 4/02* | (2018.01) | |
| *G06Q 30/02* | (2023.01) | |
| *G08G 1/005* | (2006.01) | |
| *G06Q 50/00* | (2012.01) | |
| *G06Q 10/0631* | (2023.01) | |
| *G06Q 30/0207* | (2023.01) | |
| *G06Q 30/0241* | (2023.01) | |
| *G01C 21/36* | (2006.01) | |
| *G06Q 10/047* | (2023.01) | |

(52) U.S. Cl.
CPC .......... *G06Q 10/025* (2013.01); *G06Q 10/04* (2013.01); *G06Q 10/047* (2013.01); *G06Q 10/06311* (2013.01); *G06Q 30/0207* (2013.01); *G06Q 30/0241* (2013.01); *G06Q 50/01* (2013.01); *G06Q 50/30* (2013.01); *G08G 1/005* (2013.01); *G08G 1/202* (2013.01); *H04W 4/026* (2013.01)

(58) Field of Classification Search
CPC .......... G06Q 10/047; G06Q 10/06311; G06Q 30/0207; G06Q 30/0241; G06Q 50/01; G06Q 50/30; G08G 1/005; G08G 1/202; H04W 4/026

See application file for complete search history.

(56) References Cited

U.S. PATENT DOCUMENTS

| 10,458,802 | B2 | 10/2019 | Marco |
|---|---|---|---|
| 2015/0278712 | A1 | 10/2015 | Fujita et al. |
| 2017/0098377 | A1 | 4/2017 | Marco et al. |
| 2017/0200321 | A1 | 7/2017 | Hummel et al. |
| 2017/0213165 | A1 | 7/2017 | Stauffer et al. |
| 2018/0060827 | A1 | 3/2018 | Abbas et al. |
| 2018/0060988 | A1 | 3/2018 | Klenk et al. |
| 2019/0066250 | A1 | 2/2019 | Levy et al. |
| 2020/0033150 | A1 | 1/2020 | Marco |

OTHER PUBLICATIONS

Communication pursuant to Article 94(3) EPC as received in European application 181770942 dated Nov. 27, 2020.
U.S. Appl. No. 15/620,903, Mar. 18, 2019, Office Action.
U.S. Appl. No. 15/620,903, Jun. 13, 2019, Notice of Allowance.
U.S. Appl. No. 16/596,176, Feb. 9, 2021, Notice of Allowance.

* cited by examiner

NAVIGATING DRIVERS TO DYNAMICALLY SELECTED DROP-OFF LOCATIONS FOR SHARED RIDES

CROSS-REFERENCE TO RELATED APPLICATIONS

This application is a continuation of U.S. patent application Ser. No. 16/596,176, filed on Oct. 8, 2019, which is a continuation of U.S. patent application Ser. No. 15/620,903, filed Jun. 13, 2017 which issued as U.S. Pat. No. 10,458,802. Each of the aforementioned applications is hereby incorporated by reference in its entirety.

TECHNICAL FIELD

This disclosure relates in general to the field of mobile applications and, more particularly, to a system and method for navigating drivers to dynamically selected drop-off locations for shared rides.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment, a method comprises receiving, at a backend server, a first request for a shared ride and a desired drop-off location from a first passenger; analyzing, by the backend server, a plurality of prospective routes to a plurality of prospective drop-off locations that are within a drop-off area associated with a desired drop-off location; selecting, by the backend server, a first drop-off location for the first passenger from the plurality of drop-off locations and a route to the first drop-off location based upon the likelihood of receiving a request for a shared ride with a prospective pick-up location within a limit of deviation from the route; and navigating a driver for at least a portion of the selected route.

Example Embodiments

Figure 1:
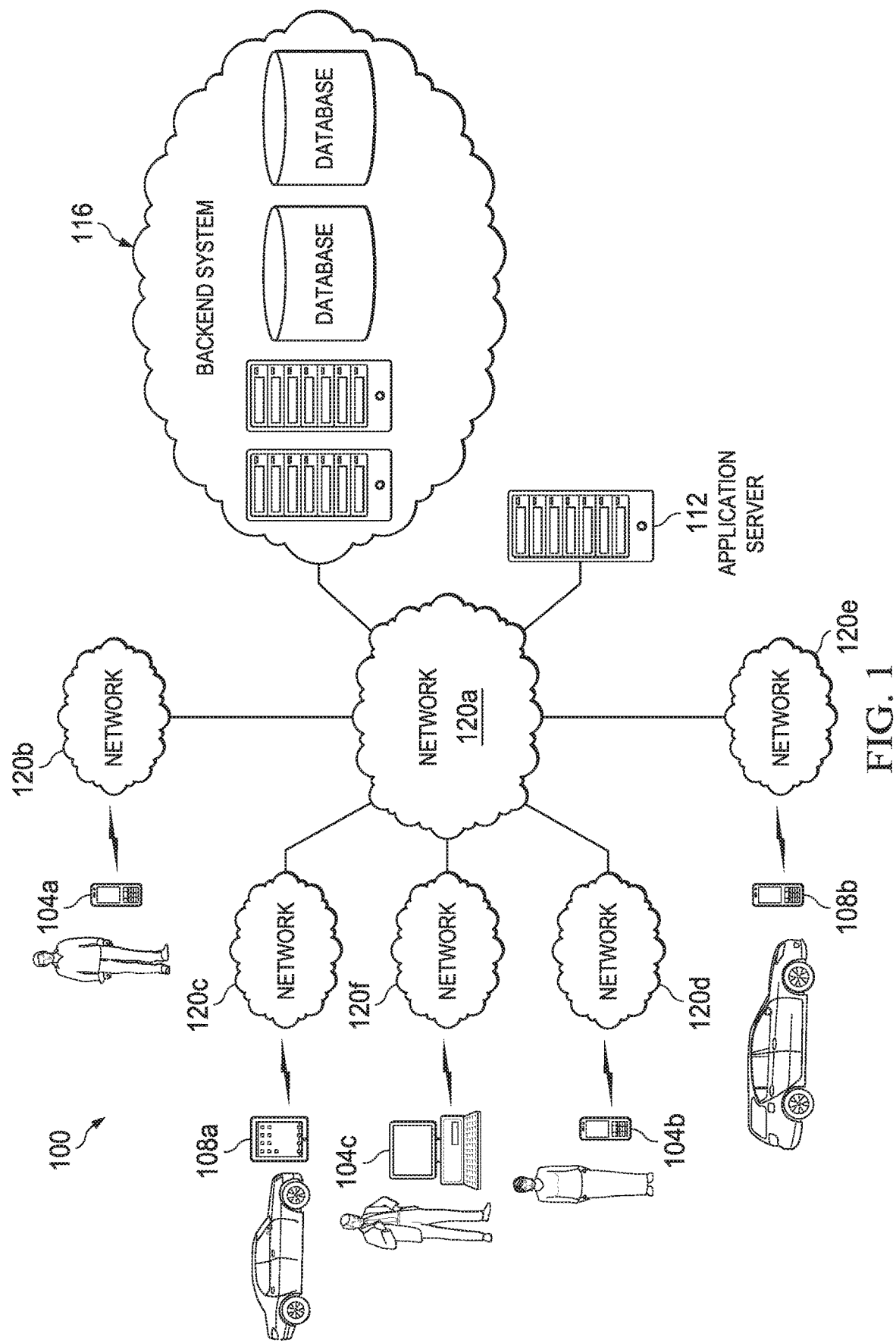
FIG. 1 illustrates a block diagram of a transportation system in accordance with certain embodiments.

FIG. 1 illustrates a block diagram of a transportation system 100 in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of passengers and drivers associated with a transportation service by dynamically selecting drop-off locations for passengers utilizing a shared ride service to optimize the efficiency of the transportation service and the utilization of drivers. In a typical ride share service, the pick-up location and drop-off location are advertised in advance to a passenger and the passenger decides whether these locations are acceptable before the passenger issues a transportation request to the transportation service. In various embodiments of the present disclosure, the transportation service allows the user to specify a desired pick-up location and a desired drop-off location. In order to optimize a group ride (i.e., a ride in which at least a portion of a ride taken by a particular passenger is shared with another passenger), the transportation service may select the actual pick-up location and/or drop-off location for the user. In an embodiment, the pick-up location may be within a limit of deviation from the desired pick-up location. For example, the transportation service may guarantee that the pick-up location will be within a 200 meter (or other threshold distance) radius of the desired pick-up location. Similarly, the drop-off location may be within a limit of deviation from the desired drop-off location. For example, the transportation service may guarantee that the drop-off location will be within a 200 meter (or other distance) radius of the desired drop-off location. This flexibility allows the transportation service to dynamically alter the drop-off location during the group ride in order to accommodate one or more additional passengers and/or take a route that is more likely to result in the addition of one or more passengers to the group ride. Various embodiments may provide technical advantages such as improving the efficiency of group rides (which may result in less time and power or fuel expended in servicing such rides) and other technical advantages.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or other operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and drop-off locations, driver destination locations, navigational directions, etc.) to the self-driven vehicle. Accordingly, as used herein "driver" may refer to a human being that may physically drive or otherwise control movement of a vehicle or to the vehicle itself (e.g., including the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), or car preference information (e.g., what models or color of car the user prefers).

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a drop-off location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected, e.g., through a deduction that the driver's device is not logged into the transportation service through the driver application), or the driver may be "inactive," meaning that the driver only desires to receive particular requests meeting certain exception criteria.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term computing device, is intended to encompass any suitable processing device. For example, portions of backend system 116 (including backend server 302) or application server 112 may be implemented using servers (including server pools) or other computers. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
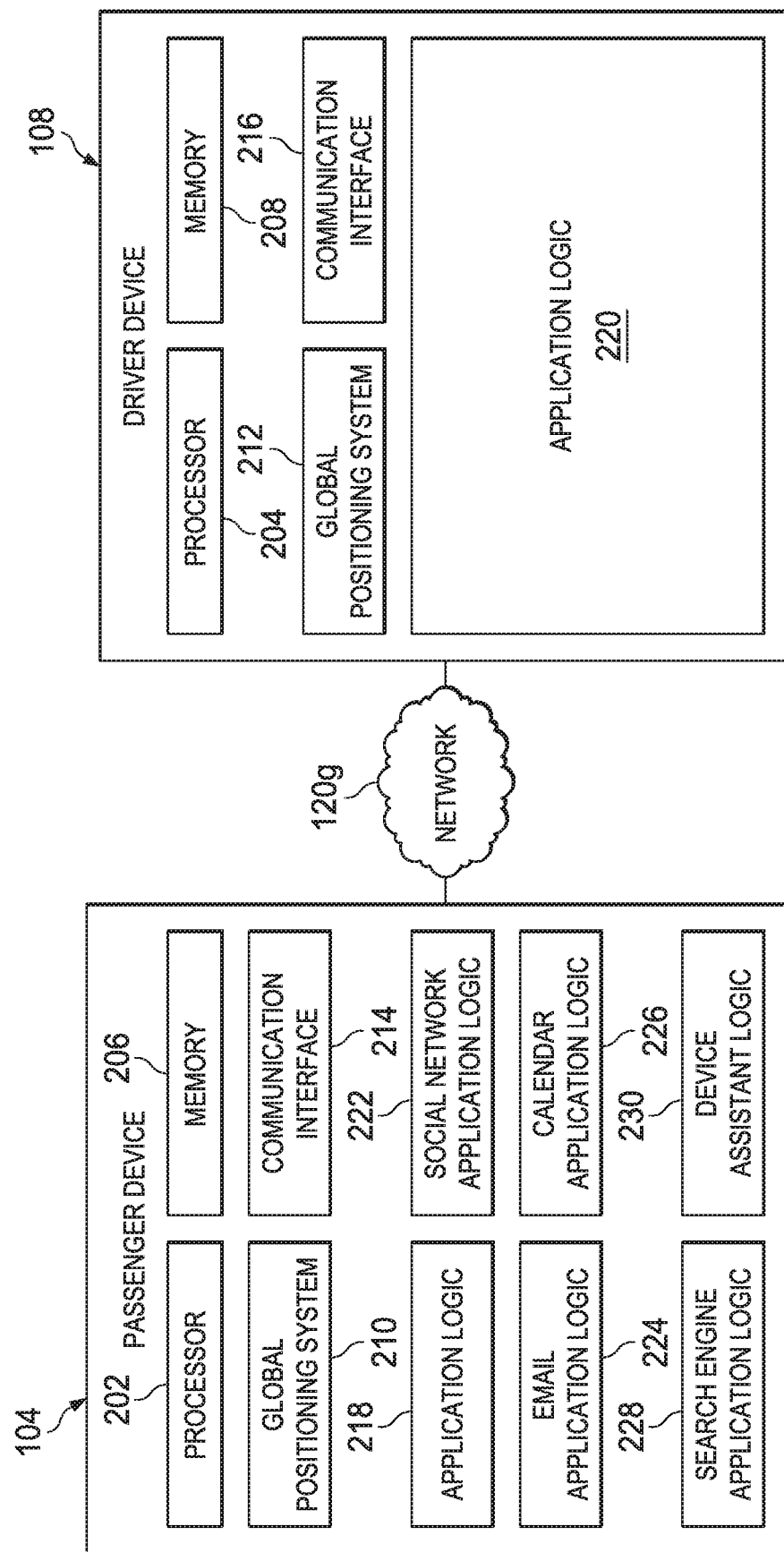
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber that has registered an account with the transportation service or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processor 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the passenger application described herein. Similarly, application logic 220 may include logic providing, at least in part, the functionality of the driver application described herein. In a particular embodiment, the logic of devices 104 and 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In a particular embodiment, a user may supply login credentials for a social network system (e.g., FACEBOOK) or other social media or communication system (e.g., TWITTER, GMAIL, etc.) to the transportation service through application logic 218. The transportation service (e.g., through backend server) may then access the user's account on the social network system or other social media or communication system and access information associated with the user's account. As another example, passenger application logic 218 may access the user's social media or other account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In a particular embodiment, the social network system allows users to create events, invite others to events, and to indicate attendance at such events. An event may comprise a gathering of a plurality of people for any suitable purpose. Examples of events include concerts, sporting events (e.g., baseball, football, soccer, basketball, hockey, boxing, or other sports), parades, airplane arrivals, community gatherings, or other suitable gatherings. A record for an event stored by the social network system may include any suitable information, such as the name of the event, the type of event, the time and date of the event, the location of the event, a record of users that were invited to the event as well as an indication of whether the users have accepted, declined, or not yet responded to the invitation, or other suitable information about the event.

In various embodiments, the social network system may interact with passenger application logic 218 and/or backend server 302 to enhance the functionality of these components. As an example, events created in the social network system may be provided to the backend server 302 through an API or other interface to a data store of the social network system. In one embodiment, the social network system may allow backend server 302 to access events independent of a user login associated with a passenger or driver. For example, the social network system may have an arrangement with the transportation service to provide events created in the social network system to the transportation service. In another embodiment, backend server 302 may access the events visible by the transportation service's administrators, passengers, and/or drivers via their respective login credentials to the social network system.

In various embodiments, the social network system may provide any of the functionality listed above with respect to passenger application logic 218 in allowing a user to request a ride from an event and may relay received requests for rides to backend server 302 along with any suitable identifying information about the user to facilitate pick-up by a driver. In one embodiment, information associated with requesting a ride from the event may be provided on an event page (e.g., a page that displays the details of the event) viewed by the user using social network application logic 222, a network browser, or other means. The information associated with requesting a ride may include instructions to or an interface (e.g., a link) to request a ride through the social network system, instructions to or a link to download passenger application logic 218 in order to request a ride, an advertisement about the transportation service along with an indication that the transportation service may provide a ride from the event, a coupon for a discounted ride from the event, or other suitable information facilitating the request of a ride from a user (who may or may not already be a customer of the transportation service). In another embodiment, information associated with requesting a ride may be sent to the user by the social network system through the social network application logic 222 (e.g., via a push notification) or other means (e.g., email, text messaging). In various embodiments, the information associated with requesting a ride from the event is provided to the user in response to a determination that the user is at the event.

Email application logic 224 may provide an interface for the passenger to read, draft, and/or manage emails. Email application logic 224 may comprise a traditional email client (e.g., Microsoft Outlook or a native iOS or Android mail application) or a web-based email application (e.g., a web browser or other application operable to access Outlook.com, Gmail, Yahoo! Mail, or other web-based email service).

Calendar application logic 226 may provide an interface for the passenger to read, draft, and/or manage calendar appointments and related tasks. Calendar application logic 226 may comprise a traditional calendar client (e.g., Microsoft Outlook or a native iOS or Android calendar application) or a web-based calendar application (e.g., a web browser or other application operable to access Outlook.com, Google Calendar, or other web-based calendar service).

Search engine application logic 228 may provide an interface for the passenger to perform Internet keyword searches. In various embodiments, logic 228 is operable to receive input forming a keyword search. In some embodiments, logic 228 may also perform the keyword search by transmitting the search to one or more servers operable to perform the search and provide search results back to logic 228. In other embodiments, logic 228 may communicate the input to another application to perform the keyword search. In various embodiments, logic 228 may present the search results to the passenger via any suitable interface (e.g., a visual or audio interface). In various embodiments, logic 228 may comprise a web browser or other application.

Device assistant logic 230 may comprise logic to enhance the functionality of other applications of passenger computing device 104. In particular embodiments, device assistant logic 230 may comprise an intelligent personal assistant, such as Siri, Cortana, Google Now, or similar assistant. In various embodiment, device assistant logic 230 may monitor activity of the passenger computing device 104, including an operating system or one or more applications of passenger computing device 104. For example, device assistant logic 230 may access emails, instant messages, or text messages sent by, received by, or accessible by email application logic 224 or other logic of passenger computing device 104. As another example, device assistant logic 230 may access calendar appointments available through calendar application logic 226 (which may be stored in a calendar file stored by passenger computing device 104 or on a remote server). As another example, device assistant logic 230 may access search queries made through search engine application logic 228. As another example, device assistant logic 230 may access transportation requests made through passenger application logic 218 or detect when passenger application logic 218 is opened. As another example, device assistant logic 230 may access the location of passenger computing device 104 using data determined by global positioning system 210.

In various embodiments, device assistant logic 230 may enhance the user experience of the passenger by answering questions from the passenger, making recommendations to the passenger, and performing other actions, such as drafting emails, texts, or calendar appointments. In addition to answering questions explicitly asked by the passenger, device assistant logic 230 may proactively obtain information and present the information to the passenger. In various embodiments, the proactive presentation of information is based upon previous user activity with respect to passenger computing device 104. For example, device assistant logic 230 may present or direct the presentation of (e.g., within a web browser) the status of a flight reservation or other travel reservation that the passenger booked or accessed using a web browser of the passenger computing device 104 or for which a confirmation email was received via email application logic 224. As other examples, device assistant logic 230 may direct the presentation of hotel or restaurant reservations, weather information, sporting event information, package tracking information, local movie times, stock prices, news events, or other information based on the passenger's location, emails, calendar appointments, search or browsing history, or other activity.

Device assistant logic 230 may also use information obtained from the operating system or applications of passenger computing device 104 to enhance the user experience of the passenger with respect to the transportation service. For example, information obtained by the device assistant logic 230 may be used to identify events that the passenger may be attending. In various embodiments, device assistant logic 230 may communicate device activity information (which may include at least a subset of the gathered information or other information obtained by processing at least a subset of the gathered information) directly to a server of backend system 116 controlled by the transportation service. In other embodiments, device assistant logic 230 may communicate activity information to a third party server controlled by, for example, the provider of the device assistant logic (e.g., Google, Apple, Microsoft, etc.), which may then communicate the device activity information (or a subset thereof) to a server of backend system 116 controlled by the transportation service. In yet other embodiments, device assistant logic 230 may communicate device activity information with passenger application logic 218 which may then communicate device activity information (or a subset thereof) to the backend system 116.

Figure 3:
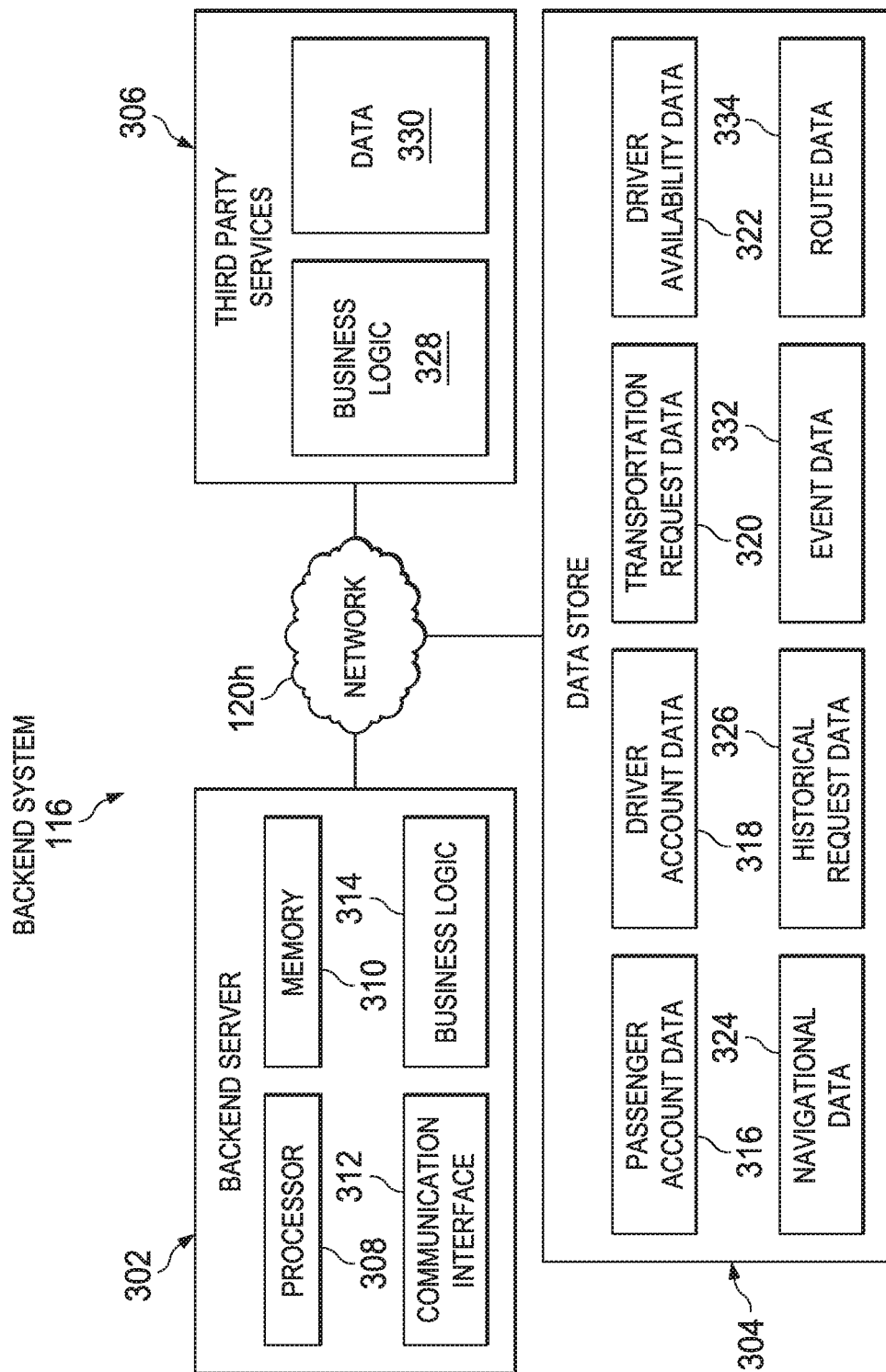
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In various embodiments, one or more of backend server 302, data store 304, and third party services 306 (or portions thereof) may be integrated together on a single device.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, transportation request data 320, driver availability data 322, navigational data 324, historical request data 326, event data 332, and route data 334. The various data may be updated at any suitable intervals.

Passenger account data 316 may include any suitable information associated with passenger accounts, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, a pick-up location determined based on the desired pick-up location (e.g., during group rides the passenger may be picked up at a location that is near the desired pick-up location, but not the same as the desired pick-up location), the desired pick-up time, the estimated time remaining until a driver can pick up the passenger, the actual pick-up time, the desired drop-off location of the passenger (which the passenger may or may not provide at the time the request is made), a drop-off location determined based on the desired drop-off location (e.g., during group rides the passenger may be dropped off at a location that is near the desired drop-off location, but not the same as the desired drop-off location), the expected arrival time at the drop-off location, the type of vehicle requested, estimated fare for the trip, current accumulated fare for the trip, estimated time and mileage remaining in the trip, a maximum detour amount for a request that is part of a group ride (which may be expressed, e.g., in distance or time with respect to the distance or time of an optimum or other advertised route) other information specified by the user (e.g., requested merchandise, requested minimum rating of driver), whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). As an example, an entry in the driver availability data 322 may include an identification of a driver and any suitable associated information, such as one or more of a current location of the driver, whether the driver is available to transport passengers, whether the driver is currently transporting a passenger, a drop-off location of a current trip of the driver, an estimate of how long it will be before the driver finishes his current trip, whether the driver has opted for automatic acceptance of transportation requests, or other suitable information. In various embodiments, driver availability data 322 may also specify whether particular drivers are available to service group rides. For example, the data may specify whether a particular driver is willing to service group rides or whether the driver is currently servicing a group ride.

Navigational data 324 may comprise information supporting navigation functions provided by the passenger applications and driver passenger applications. For example, navigational data 324 may comprise map data that may be sent to passenger computing devices 104 and/or driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the drop-off location was reached, the total time of the trip, the total fare, a rating given by the passenger to the driver or by the driver to the passenger for the trip, or other suitable information associated with the trip.

Event data 332 may comprise information about upcoming events, currently occurring events, and events that have already ended. An event may comprise a gathering of a plurality of people for any suitable purpose. Examples of events include concerts, sporting events (e.g., baseball, football, soccer, basketball, hockey, boxing, or other sports), parades, airplane arrivals, community gatherings, or other suitable gatherings. Events identified by the backend server 302 may be events in which a plurality of passengers are likely to request transportation from the transportation service to the event or from the event or events that otherwise may affect the flow of traffic or the availability of drivers.

An entry in event data 332 may include any suitable information about an event, such as a title of the event, a location of the event (which may be expressed in any suitable manner, such as GPS or other coordinates, an address, or a name of the venue at which the event is held), an estimated start time of the event, an estimated end time of the event, passenger pick-up locations associated with the event (e.g., one or more ideal locations for drivers to pick up passengers that attended the event), an estimation of the number of people attending the event, an indication of the type of the event (e.g., a baseball game, a concert, an airplane arrival), an event information source associated with the event (e.g., a web address or other identifier of an information source from which current information about the event may be obtained), or other suitable information associated with the event. An entry in event data 330 may include a tracking of and/or an estimate of passenger requests for transportation from passengers that will be or are attending the event. For example, an entry may include an estimation of the aggregate number of passenger requests that will be and/or have been received from passengers at the event and/or a predicted timeline of how many requests have been and/or will be received as a function of time relative to the completion of the event (e.g., an average number of requests per minute received prior to and after the end of the event). In some embodiments, an indication of each passenger request made in association with the event may be stored. Whether a passenger request is associated with the event may be determined in any suitable manner, such as by filtering requests based on a temporal and geographical proximity with the event.

In various embodiments, backend server 302 may classify an event based on the information received from one or more event information sources to facilitate comparison with historical events stored in event data 332. The classification may be based on the source of the event information, key words included in the event information, manual entry of the classification, or other suitable information. As just one example, particular events obtained from a basketball team's website may be classified as basketball games for the particular team. Backend server may analyze historical events with similar classifications in order to determine patterns in start times, end times, and/or the number (and timing of) passenger requests associated with the events in order to more accurately predict the same for upcoming or ongoing events.

In various embodiments, backend server 302 may determine or estimate a start time and/or a completion time for the event. In particular embodiments, backend server 302 may identify the start time or completion time from information provided by an event information source (e.g., the start time, end time, or the duration of the event may be specified by the event information source). In some embodiments, the start time or end time of an event may be estimated based on start times or end times associated with past events of the same type stored in event data 332. In some embodiments, backend server 302 may update the estimated end time of an event one or more times during the event (e.g., periodically during the event). For example, backend server 302 may connect to the event information source to determine how much time is left until the event is over. As various examples, sports websites may include information indicating how far a game has progressed or an airport website may indicate an expected arrival time for a particular flight. Event data 332 may include information about past events that may be used by backend server to determine the number of passenger requests and/or estimated start times or completion times for current or upcoming events stored in event data 332.

In various embodiments, backend server 302 may connect to event information sources through one or more networks to discover events and/or obtain updated information about events. An event information source may include any source containing information about an event. For example, an event information source may be a server hosting a webpage containing event information, a server providing an API through which backend server 302 may request event information from the server, a server providing access to a file (e.g., a calendar file such as an iCalendar or vCalendar file) containing information about one or more events, a computing device which may be used by an administrator to manually enter event information, information obtained from a passenger or driver computing device, or other suitable source. In an embodiment, an event information source includes a social network system. In some embodiments, event information may be uploaded directly to backend server 302 via a flash drive or other means. In one embodiment, backend server 302 may access various websites and parse the data included in the websites to obtain the event information. The event information obtained from one or more event information sources may include any suitable information about an event, such as any of the information stored in event data 332.

Route data 334 may store information about routes between any two locations. For example, for a particular route, the information may include a total distance of the route, an expected time to travel the route, information regarding the expected rate or possibility of group ride requests at one or more near locations on or near the route for a particular time or time period, a cumulative possibility that a group ride with a pick-up location within a specified distance or time from the route will be received if the route is traveled starting at a particular time, or other suitable information associated with a route. In various embodiments, route data 334 may store information for multiple routes between a common pick-up location and a common drop-off location.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pick-up location and directions to the current location or other pick-up location) to the driver computing device 108 to direct the driver to the passenger's pick-up location and subsequently to direct the driver to the passenger's drop-off location. The backend server 302 may also provide real-time updates associated with the trip to both the passenger and the driver.

Once the passenger's drop-off location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

Figure 4:
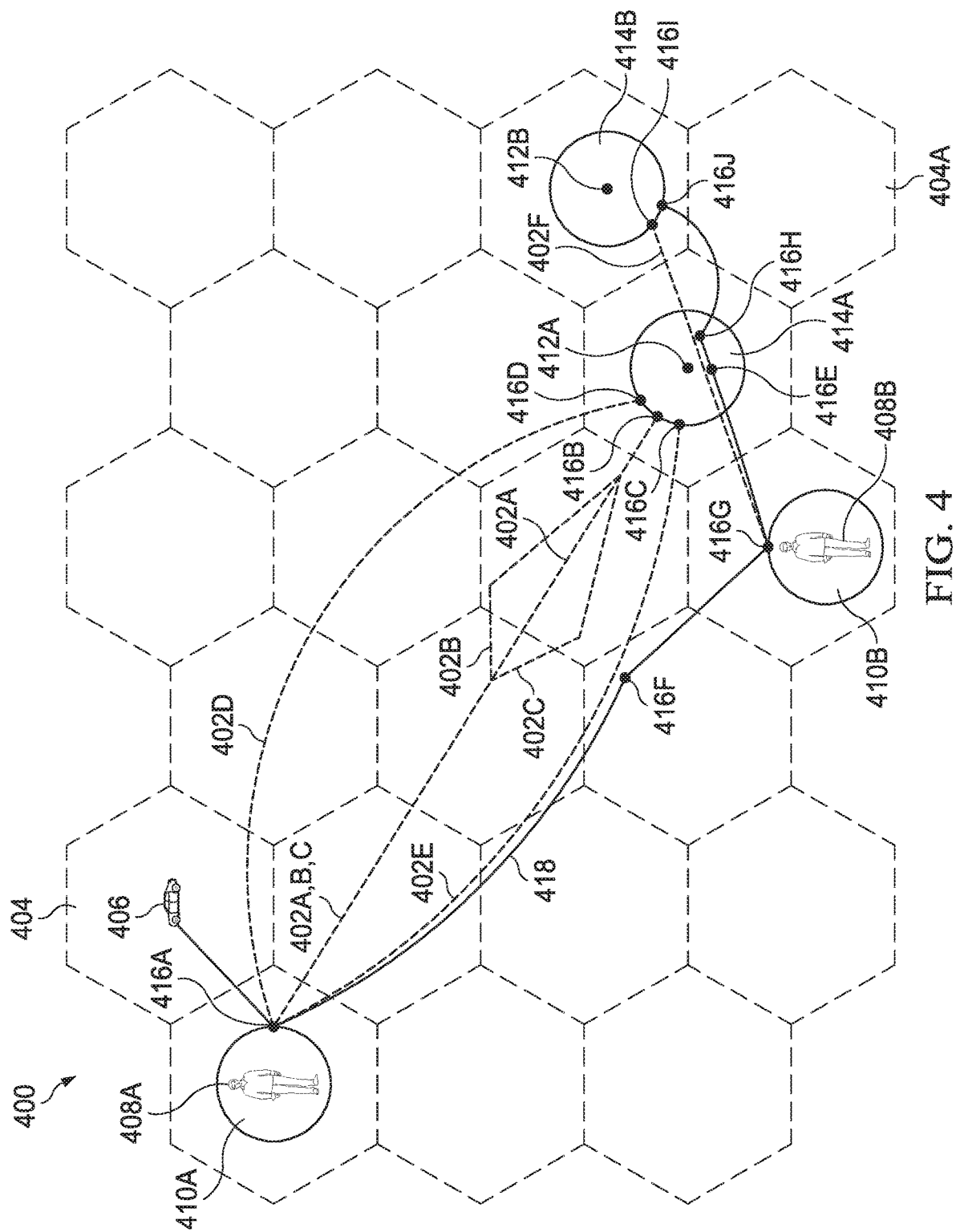
FIG. 4 illustrates a plurality of prospective routes and a route taken by a driver in accordance with certain embodiments.

FIG. 4 illustrates a plurality of prospective routes 402 and a route 418 taken by a driver 406 in accordance with certain embodiments. As described above, various embodiments of the present disclosure may enhance the experience of passengers and drivers associated with a transportation service by dynamically selecting drop-off locations for passengers utilizing a shared ride service to optimize the efficiency of the transportation service and the utilization of drivers. The transportation service may offer various types of rides, including rides that are not shared with other (non-affiliated) passengers or rides that may be shared with other passengers.

In a typical ride share service, the pick-up location and drop-off location are advertised in advance to a passenger and the passenger decides whether these locations are acceptable (or the transportation service may determine whether the passenger's desired pick-up location and drop-off location are within a threshold distance of the pick-up location and drop-off location specified by the transportation service) in association with the making of a request for a shared ride.

In various embodiments of the present disclosure, a passenger 408A may submit a request for a shared ride to backend server 302 (e.g., via passenger computing device 104). The request may indicate that the passenger is willing to share at least a portion of the ride with at least one other passenger selected by the transportation service. The request may specify a desired pick-up location (which may be the location of the passenger 408A or some other location). In this example, an assumption is made that the desired pick-up location is the location of passenger 408A. The request may also specify a desired drop-off location 412A. The desired drop-off location 412A may be specified in the initial request made by the passenger 408A or at a later time (e.g., at the time the passenger is picked up or in response to a query from the backend server).

In various embodiments, a shared ride may be associated with various parameters, any of which may be communicated to the passenger 408A at any suitable time prior to the ride (e.g., before the request is made or after the request is accepted), during the ride, or at the end of the ride.

One example parameter may be a limit of deviation from the desired pick-up location. The limit of deviation may specify an area 410A within which the passenger agrees to meet the driver 406. That is, the transportation service may select any location within the area 410A as a meeting place for the driver and the passenger 408A (thus the passenger agrees to move to that location in order to be picked up). In a particular embodiment, the limit of deviation may specify a radius, such as 50 meters, 100 meters, 200 meters, or other suitable distance. In the embodiment depicted in FIG. 4, the limit of deviation specifies a radius, thus the pick-up area 410A is a circle around the desired pick-up location of the passenger 408A. In other embodiments, the limit of deviation may specify any suitably shaped area, such as an irregularly shaped area (e.g., the pick-up area is not symmetrical around the desired pick-up location). In a particular embodiment, the limit of deviation may expressed in any other suitable manner (e.g., walking time or driving time from the desired pick-up location).

Another example parameter may be a limit of deviation from the desired drop-off location. The limit of deviation may specify an area 414A within which the passenger agrees to be dropped off. That is, the transportation service may select any location within the area 414A as the drop-off location (thus the passenger may then need to walk or find other transportation to the passenger's desired destination). In a particular embodiment, the limit of deviation from the desired drop-off location may specify a radius, such as 50 meters, 100 meters, 200 meters, or other suitable distance. In the embodiment depicted in FIG. 4, the limit of deviation specifies a radius, thus the drop-off area 414A is a circle around the desired drop-off location of the passenger 408A. In other embodiments, the limit of deviation may specify any suitably shaped area, such as an irregularly shaped area (e.g., the pick-up area is not symmetrical around the desired drop-off location). In a particular embodiment, the limit of deviation may expressed in any other suitable manner (e.g., walking time or driving time from the desired drop-off location).

Another example parameter may be an expected direct trip time which specifies an expected amount of time to complete the trip once the passenger is picked up if an optimum route is taken and no additional passengers are picked up. Another example parameter may be an expected trip time which specifies an expected amount of time to complete the trip once the passenger is picked up, taking into account a route to be taken and the possibility of picking up one or more other passengers. Another example parameter may be a maximum detour amount. A maximum detour amount may specify a maximum amount of time or distance that may be allotted to one or more detours from the optimum route to pick up one or more additional passengers or to travel to an area having a relatively high number of transportation requests for shared rides. A combination of the expected direct trip time and the maximum detour amount may set an upper bound on the length of time expected for the shared ride (which itself may be a parameter that is communicated to the passenger).

Another example parameter may be an expected fare for the group ride. In various embodiments, the passenger is charged less for a group ride than the passenger would have been charged for a non-group ride. As one example, the passenger may pay between 50% and 75% of the fare of a similar non-group ride. The price may be calculated based on the distance and/or estimated travel time between the desired or actual pick-up location and the desired or actual drop-off location. In a particular embodiment, the discount applied to the ride is based on the likelihood that one or more additional passengers may be picked up during the ride. In a particular embodiment, the fare for the group ride is determined by calculating the fare for a non-group ride taken between the desired or actual pick-up location and the desired or actual drop-off location using an optimal route and then applying a discount factor (e.g., multiplying by 0.5, 0.6, 0.7, or other suitable factor). In a particular embodiment, the fare may be based on the actual amount of time of the group ride, where lower amounts of time result in higher fares (since the passenger was not heavily inconvenienced by detours) and higher amounts of time result in lower fares. In a particular embodiment, if a maximum detour amount is exceeded during the group ride, an additional discount may be applied to the fare. In particular embodiments, the fare may be based on the maximum detour amount advertised to the passenger or the length of one or more detours taken during the ride. For example, a fare amount may be inversely proportional to the maximum detour amount or actual detour length (or may otherwise be reduced as the maximum detour amount or detour length becomes greater).

Another example parameter is an actual pick-up location 416A. The actual pick-up location may be based on any suitable factors, such as the desired pick-up location, the limit of deviation from the desired pick-up location (e.g., it may not be outside the limit of deviation), the actual location of the passenger (e.g., the amount of distance the passenger is asked to travel may be limited based on the amount of time expected until the driver reaches the passenger), the location of the driver 406, a desired drop-off location of another passenger currently being transported or scheduled to be transported during the group ride, traffic conditions within or around the pick-up area, or other suitable factors.

Another example parameter is an actual drop-off location. The actual drop-off location may be based on any suitable factors, such as the actual pick-up location, the desired drop-off location, a desired pick-up location of another passenger scheduled to be transported during the group ride, traffic conditions between or around the actual pick-up location and the desired drop-off location, or other suitable factors. In various embodiments, the actual drop-off location may be dynamic, such that it may be changed during the shared ride in response to changing conditions, such as the reception of a new shared ride request or changing probabilities of receiving an additional shared ride request before the current actual drop-off location is reached. In a particular embodiment, the actual drop-off location is not communicated to the user by the backend server 302 or is only communicated to the user once the passenger has been transported close to the actual drop-off location (e.g., within a threshold distance or time of the actual drop-off location) or in response to determining that an additional passenger will not be picked up during the ride.

When selecting an actual drop-off location, backend server 302 may analyze a plurality of prospective routes to a plurality of prospective drop-off locations prior to making a selection of the best drop-off location and route from the actual pick-up location to the selected drop-off location. For example, in the depicted embodiment, routes 402A-402E to prospective drop-off locations 416B-416D are analyzed. In various embodiments, multiple different routes to a particular prospective drop-off location may be analyzed. For example, routes 402A-402C to prospective drop-off location 416B may be analyzed (routes 402A, B, and C share a common path from the actual pick-up location 416A until they diverge and then converge again near the prospective drop-off location 416B). In various embodiments, any suitable prospective drop-off locations and routes thereto may be analyzed. Although the prospective drop-off locations analyzed in the depicted embodiment are each located on the perimeter of the drop-off area 414A, the prospective drop-off locations may be located at any suitable point of the drop-off area 414A that is in compliance with the limit of deviation from the desired drop-off location 412A.

In various embodiments, the routes analyzed by backend server 302 may be filtered based on a difference between an expected travel time or distance for the routes and an expected travel time or distance for the shortest route (or otherwise optimum route) from the actual pick-up location to a drop-off location within the drop-off area 414A. In a particular embodiment, if the difference exceeds a particular threshold, then the respective route is not analyzed for this shared ride. In a particular embodiment, this threshold is or is based on the maximum detour amount described above. In some embodiments, the threshold is set by reducing the maximum detour amount by a value that takes into account an expected delay to stop and pick up an additional passenger that is located on or within a threshold distance from the route.

In a particular embodiment, the analysis of a prospective drop-off location and a route thereto includes calculating a possibility of receiving a request for a shared ride with a prospective pick-up location within a limit of deviation from the route. The prospective pick-up location may include any suitable expected pick-up location, such as the actual location of the prospective passenger or a location within a pick-up area expected to be assigned to a prospective passenger where the location within the pick-up area may, at least in some situations, be selected to minimize deviation from the route. The limit of deviation may indicate how far the prospective pick-up location may be from the route while still allowing the driver to comply with the maximum detour amount or other time or distance parameter that limits detours associated with the shared ride. In a particular embodiment, the limit of deviation may be based on a difference in the distance or time expected for the particular route and the distance or time expected for the shortest route (or other optimum route). For example, if the difference between the route and the shortest route is small, the limit of deviation from the route may be larger than if the difference between the route and the shortest route is large. That is, if the route is already resulting in a large deviation from the shortest route, the time or distance allowed for detouring from that route may be smaller.

The calculation of the possibility of receiving a request for a shared ride with respect to a particular route may be performed in any suitable fashion and may be based on any suitable data. In a particular embodiment, the route may be broken down into segments of any suitable size, each segment may be associated with a time at which the segment is expected to be traveled during the group ride, and the probability of the transportation service receiving a suitable group ride request that may be serviced by the driver (e.g., a request with a pick-up location that does not deviate too far from the route) when the driver is traveling that segment may be calculated. These segment scores may then be combined in any suitable manner to determine a cumulative score for the route. As one example, if the probability of receiving a shared ride request for a particular segment i of N total segments is $P_i$, the cumulative score may be calculated as $(1-P_1)*(1-P_2)*(1-P_3)* \ldots *(1-P_N)$, which represents the probability that no additional shared ride requests are received when the route is traveled. As another example, the probabilities may be combined to determine the expected number of shared ride requests to be received when the route is traveled. Any other suitable calculations may be performed to determine the suitability of a route with respect to the likelihood of receiving one or more additional shared ride requests.

In various embodiments, the probabilities may be based on passenger demand within various zones serviced by the transportation service. FIG. 4 illustrates various driving zones 404. Although the zones 404 are depicted as hexagonal regions each having the same area, other embodiments may include zones with any suitable geographical delineations. In the depicted embodiment, the zones are of substantially identical and regular shape and size, but this is a nonlimiting example only. In some cases, the size and shape of zones may vary greatly. For example, a zone may be drawn around an airport, and may only include the airport or the airport and its immediate surrounding areas. Thus a zone could be a single reference location in some instances. As another example, other zones may be drawn around much larger geographic areas (e.g., because they do not contain a point of such specific interest). Although the zones 404 are depicted as contiguous with each other, other embodiments may include non-contiguous zones (e.g., there may be an areas that are not part of any zone).

In particular embodiments, the zones may be dynamic. That is, the delineation of the zones may be changed by the transportation service over time based on conditions within the zones. For example, if a particular zone sees a drastic reduction in passenger requests, the zone may be deleted from the zones tracked by the transportation service. As another example, if a particular spot within a zone sees an increase in passenger requests, one or more new zones may be created or the boundaries of the zone may be modified to account for this increase.

In various embodiment, passenger demand in a zone may be used to estimate the probability of an additional shared ride request being received when a particular segment of a route is expected to be traveled. As just one example, the rate of shared ride requests being received with a pick-up location in a particular zone may be used in conjunction with the length of time the driver is expected to be in the zone while driving the route to determine the probability of receiving an additional shared ride. Other suitable factors may be used to determine the probability, such as how likely a request is to be within an allowable deviation from the router or how likely a different driver is to be assigned to a shared ride request. Various method for determining passenger demand are now described.

In various embodiments, passenger demand for a zone may be estimated periodically (in some embodiments, this data may be used for other purposes as well, such as determining an amount of drivers needed or setting a surge pricing multiplier). In various embodiments, backend server 302 may estimate the number of passenger requests as a function of time (e.g., at a particular point in time or over one or more intervals of time). As an example, backend server 302 may determine the number of requests currently being serviced and/or the number of requests that are awaiting assignment of a driver. As another example, backend server 302 may estimate the average number of requests that will be received and/or be serviced per an interval of time (e.g., per minute, per five minutes, per hour, etc.). As another example, backend server 302 may estimate the number of requests that are expected within multiple intervals of time that each begin at a different time, such as the number of requests expected from 6:00 PM-6:05 PM, from 6:05 PM-6:10 PM, etc. The passenger demand may be estimated relative to any suitable time. For example, the passenger demand may be estimated for the next five minutes. As another example, the passenger demand may be estimated for a time interval beginning ten minutes in the future and ending fifteen minutes in the future.

The passenger demand within a zone may be estimated at any suitable interval. For example, the estimation of the passenger demand may be updated periodically (e.g., every 2 minutes, every 5 minutes, or at any other period interval) or in response to an event (such as a rapid change in the rate at which transportation requests are being received).

The estimation of demand may be based on the number of pending transportation requests (i.e., transportation requests that have been received but not assigned to a driver and/or transportation requests that are currently being serviced) originating from the zone (and/or neighboring zones), the number of transportation requests received over a particular time interval (e.g., over a recent time interval such as the last 10 minutes) with a pick-up location in the zone (and/or neighboring zones), the number of transportation requests expected to be received for a particular time interval (with pick-up locations in the zone and/or neighboring zones), and/or other suitable information. In various embodiments, the number of transportation requests expected to be received may be based on data stored in historical request data 326 (e.g., the number of requests historically received during a time period that is similar to the time period for which the estimate is being made). As just one example, the number of transportation requests expected to be received on a Wednesday morning at 7:30 AM-7:45 AM may be based on the number of transportation requests received over the same time period on one or more previous Wednesdays.

In various embodiments, the number of historical passenger requests over a timeframe may be adjusted by a factor indicative of the number of recent requests. For example, continuing the example above, the number of requests received from 7:15 AM-7:30 AM on the Wednesday morning relative to historical requests received at a similar time on one or more previous Wednesdays may be ascertained and used to adjust the number of historical requests in order to estimate an expected number of requests to be received that Wednesday morning from 7:30 AM-7:45 AM. For example, if the transportation service is receiving a number of requests that morning that is 1.2× higher than usual, an estimate that is based on historical requests may be adjusted upwards by a factor of 1.2×. Other embodiments may include the adjustment of a number derived from historical requests in any suitable manner based on current demand to estimate a number of passenger requests to be received over a particular time period.

In various embodiments, the estimated passenger demand for a zone may be based on one or more events in the zone or a nearby zone. The number of expected passenger requests may be determined in any suitable manner. For example, backend server 302 may determine an expected number of passengers for a particular time period based on any suitable factors such as the expected total attendance at the event (e.g., as indicated by an event information source or as derived from records of similar past events stored in event data 332), the percentage of the population (e.g., in a particular region including the location of the event) that utilize the transportation service, a number of passengers detected as attending the event (e.g., based on GPS coordinates received from passenger mobile devices), the location of the event (some locations may result in a higher rate of transportation requests than others), the time of the event, past passenger requests from similar events (e.g., as stored in historical request data 326 and/or event data 332), data representing the timing of requests associated with past events (e.g., as stored in historical request data 326, event data 332, and/or other data), and/or other suitable factors. In one embodiment, the expected total attendance at the event may be based on a number of users of a social network that have indicated an intent to attend the event. As just one example, the number of transportation requests received may spike within a first zone prior to the beginning of a nearby event (e.g., being held in a second zone) and may spike within the second zone at the end of the event.

In various embodiments, the number of historical requests over a timeframe may be adjusted by a factor indicative of the number of recent requests. For example, data associated with one or more previous football games may indicate that 20 requests are likely to be received from a zone during a first 5 minute period before a football game is to start on a given day and 30 requests are likely to be received from the zone during a second 5 minute period before the football game. However, if a time period corresponding (i.e., the same number of minutes before the start of the game) to the first 5 minute period yields only 10 passenger requests, then the estimate for the second 5 minute period may be adjusted downward (e.g., to 15 passenger requests or other number). Any suitable number of historical time periods may be compared with recent time periods during the estimation of passenger demand.

In various embodiments, the passenger demand for a future time period may be estimated based on a combination of one or more events, historical passenger request data, and/or current passenger request data. For example, the expected number of passenger requests based on historical passenger request data for a particular time period may be determined, the increase in requests expected to be generated due to one or more events may be added, and the result may be adjusted by the current rate of passenger requests relative to expected requests (which could also be based on historical passenger request data and/or event data).

Although in various embodiments, the passenger demand for shared rides is relevant, this demand may be based on shared ride requests and/or non-shared ride requests (e.g., the amount of non-shared ride requests may be adjusted to estimate the demand for shared ride requests in a particular zone or other area).

Once the prospective drop-off locations and routes have been analyzed, an actual drop-off location and route thereto is selected. In a particular embodiment, the selection is based at least in part on a likelihood that at least one additional request for a shared ride that has a prospective pickup location within a limit of deviation from the route will be received while the driver is traveling the route.

In various embodiments, the actual drop-off location may be changed dynamically after the shared ride has begun based on, e.g., an additional shared ride request or a shift in probabilities of receiving an additional shared ride request in one or more zones (or portions thereof). In the example depicted in FIG. 4, it is assumed that drop-off location 416C and route 402E were selected. The actual path taken by the driver is shown by 418. Up until point 416F, the driver follows route 402E. At some point during travel of route 402E, an additional shared ride request is received from passenger 408B. This shared ride request has a desired pick-up location of the location of passenger 408B, a pick-up area of 410B (which is defined by a limit of deviation associated with the request of passenger 408B, a desired drop-off location of 412B, and a drop-off area of 414B.

A determination is made that the additional passenger may be added to the group ride without violating any constraints (e.g., detour timing or distance constraints). An actual pick-up location 416G is determined for the passenger 408B, and the passenger may be instructed to move to that location prior to being picked up by driver 406. The driver deviates from route 402E at point 416F in order to pick up the new passenger at the actual pick-up location 416G determined by the backend server 302. One or more prospective routes and prospective drop-off locations may be analyzed for passenger 408B and the actual drop-off location 416I and route 402F is selected in a manner similar to that described above.

The additional shared ride request also prompts a change in the actual drop-off location for passenger 408A to the new location 416E which is located on route 402F. The illustration shows that the actual drop-off location may, at least in some situations, be based at least in part on a desire to reduce the distance between the actual drop-off location and the desired drop-off location when it is not overly burdensome to the driver to do so.

The actual drop-off location and route may also be changed in response to a change in the probability of receiving an additional shared ride request along a particular route. For example, in the embodiment depicted, the driver 406 may continue along route 402F up until location 416H. At 416H, in response to an increase in likelihood of receiving an additional ride request in zone 404A, the actual drop-off location for passenger 408B may be changed to location 416J and the route taken by the driver is adjusted to pass through zone 404A.

Figure 5:
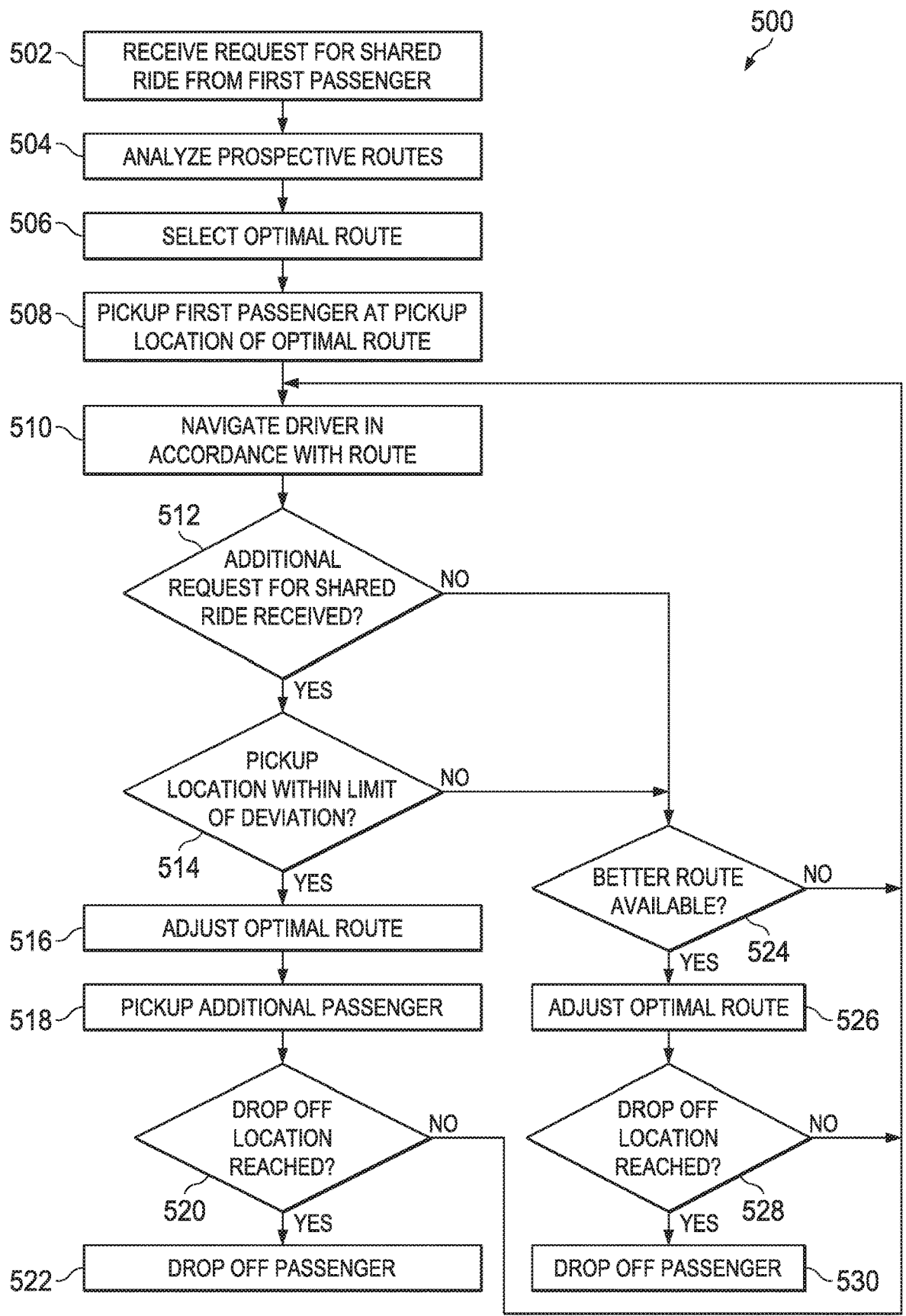
FIG. 5 illustrates an example flow for navigating drivers to dynamically selected drop-off locations for shared rides in accordance with certain embodiments.

FIG. 5 illustrates an example flow for navigating drivers to dynamically selected drop-off locations for shared rides in accordance with certain embodiments. Some or all of the operations of flow 500 may be performed by any suitable logic of system 100, such as a backend system, backend server 302, and/or other components.

At 502, a request for a shared ride is received from a first passenger. At 504, various prospective routes are analyzed for the shared ride. For example, the prospective routes may be analyzed to determine which routes provide the highest likelihoods that the driver will be able to service an additional shared ride request if the driver takes the route while still obeying time and/or distance constraints associated with the first passenger's shared ride request. At 506, an optimal route is selected. The optimal route may be selected based on any suitable factors, such as the likelihood that the driver will be able to service at least one additional shared ride request if the driver takes the route, the expected time and/or distance of the route, or other suitable factors.

At 508, the first passenger is picked up at the actual pick-up location of the optimal route (which in some embodiments may be a desired pick-up location specified in the shared ride request from the first passenger or a different pick-up location specified by the backend server 302). At 510, the driver is navigated in accordance with the optimal route. For example, backend server 302 may navigate the driver by providing navigation information to a driver computing device 108 associated with the driver.

At 512, a determination is made as to whether an additional request for a shared ride has been received. If an additional request has been made, a determination is made at 514 as to whether a pick-up location associated with the request is within a limit of deviation from the route of the shared ride. If the determination is positive, the optimal route may be adjusted at 516 such that the additional passenger may be picked up at 518. In various embodiments, the adjustment of the route may also adjust the actual drop-off location for the first passenger. At 520 a determination is made as to whether the drop-off location for any of the passengers has been reached. If it has, the respective passenger is dropped off at 522. If a drop-off location has not been reached, the flow may return to 510 and navigation of the driver may continue.

If no additional request for a shared ride is received at 512 or a pick-up location of an additional shared ride request is not within a limit of deviation at 514, then a determination is made at 524 as to whether a better route is available. For example a determination may be made as to whether a route modification would lead to a higher likelihood of picking up an additional passenger. If a better route is not available, the flow returns to 510. If a better route is available, the optimal route is adjusted at 526. At 528, a determination is made as to whether a drop-off location has been reached. If it has not, the flow may return to 510. If a drop-off location has been reached, a passenger is dropped off at 530. Although not shown, if one or more additional passengers remain after 522 and 530, the flow may return to 510.

Some of the operations illustrated in FIG. 5 may be repeated, combined, modified or deleted where appropriate, and additional steps may also be included. Additionally, operations may be performed in any suitable order or concurrently without departing from the scope of particular embodiments. For example, operations 512 and 524 may be performed at any suitable intervals and in any suitable order, including simultaneously or independently of each other.

It is important to note that the operations in FIG. 5 illustrate only some of the possible scenarios that may be executed by, or within, the various components of the system described herein. Some of these operations may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may be performed by any suitable component(s) of the system. For example, certain functionality described herein as being performed by backend server 302, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 302 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke subsection (f) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    receiving, via a processing device of a first requestor device, a first transportation request associated with a first destination;
    generating, based on the first transportation request, a digital transportation route that comprises a drop-off location for the first requestor device;
    transmitting navigational data comprising the digital transportation route to a driver computing device, causing the driver computing device to travel in accordance with the digital transportation route;
    during transport of the first requestor device in accordance with the digital transportation route, receiving, from a second requestor device, a second transportation request associated with a second destination;
    generating, based on the second transportation request, a combined drop-off location for shared transport of both the first requestor device and the second requestor device;
    determining, that the combined drop-off location is positioned within a first limit of deviation from the first destination for the first requestor device;
    determining that the combined drop-off location is positioned within a second limit of deviation from the second destination for the second requestor device;
    generating a modified digital transportation route during transport of the first requestor device to include the combined drop-off location instead of the drop-off location based on GPS data indicating a current location of the driver computing device; and
    transmitting, by the processing device to the driver computing device, navigational data causing the driver computing device to travel according to the modified digital transportation route.

2. The method of claim 1, wherein the navigational data comprises historical and current traffic flow information along the modified digital transportation route.

3. The method of claim 2, further comprising:
    identifying, based on the first transportation request, that the first limit of deviation comprises a first distance radius relative to the first destination; and
    identifying, based on the second transportation request, that the second limit of deviation comprises a second distance radius relative to the second destination.

4. The method of claim 2, further comprising:
    identifying the first limit of deviation comprises a first walking-time limit of deviation relative to the first destination; and
    identifying the second limit of deviation comprises a second walking-time limit of deviation relative to the second destination.

5. The method of claim 1, further comprising:
    determining a first transportation fare for shared transport of the first requestor device based on a first distance between the combined drop-off location and the first destination; and
    determining a second transportation fare for shared transport of the second requestor device based on a second distance between the combined drop-off location and the second destination.

6. The method of claim 1, further comprising:
    providing, for display within a first presentation of a graphical user interface of the first requestor device, the digital transportation route; and
    subsequently providing, for display within a second presentation of the graphical user interface of the first requestor device, the modified digital transportation route comprising the combined drop-off location.

7. The method of claim 1, wherein modifying the digital transportation route comprises modifying the digital transportation route to include a second pickup location for pickup of the second requestor device.

8. A system comprising:
    at least one processor; and
    a non-transitory computer-readable medium comprising instructions that, when executed by the at least one processor, cause the system to:
        receive, via a processing device of a first requestor device, a first transportation request associated with a first destination;
        generate, based on the first transportation request, a digital transportation route that comprises a drop-off location for the first requestor device;
        transmit navigational data comprising the digital transportation route to a driver computing device, causing a driver computing device to travel in accordance with the digital transportation route;
        during transport of the first requestor device in accordance with the digital transportation route, receive, from a second requestor device, a second transportation request associated with a second destination;
        generate, based on the second transportation request, a combined drop-off location for shared transport of both the first requestor device and the second requestor device;

determine that the combined drop-off location is positioned within a first limit of deviation from the first destination for the first requestor device;
determine that the combined drop-off location is positioned within a second limit of deviation from the first destination for the first requestor device;
generate a modified digital transportation route during transport of the first requestor device to include the combined drop-off location instead of the drop-off location based on GPS data indicating a current location of the driver computing device; and
transmit, by the processing device to the driver computing device, navigational data causing the driver computing device to travel according to the modified digital transportation route.

9. The system of claim 8, wherein the navigational data comprises historical and current traffic flow information along the modified digital transportation route.

10. The system of claim 9, further comprising instructions that, when executed by the at least one processor, cause the system to:
identify, based on the first transportation request, that the first limit of deviation comprises a first distance radius relative to the first destination; and
identify, based on the second transportation request, that the second limit of deviation comprises a second distance radius relative to the second destination.

11. The system of claim 9, further comprising instructions that, when executed by the at least one processor, cause the system to:
identify the first limit of deviation comprises a first walking-time limit of deviation relative to the first destination; and
identify the second limit of deviation comprises a second walking-time limit of deviation relative to the second destination.

12. The system of claim 8, further comprising instructions that, when executed by the at least one processor, cause the system to:
determine a first transportation fare for shared transport of the first requestor device based on a first distance between the combined drop-off location and the first destination; and
determine a second transportation fare for shared transport of the second requestor device based on a second distance between the combined drop-off location and the second destination.

13. The system of claim 8, further comprising instructions that, when executed by the at least one processor, cause the system to:
provide, for display within a first presentation of a graphical user interface of the first requestor device, the digital transportation route; and
subsequently provide, for display within a second presentation of the graphical user interface of the first requestor device, the modified digital transportation route comprising the combined drop-off location.

14. The system of claim 8, further comprising instructions that, when executed by the at least one processor, cause the system to modify the digital transportation route by modifying the digital transportation route to include a second pickup location for pickup of the second requestor device.

15. A non-transitory computer-readable medium comprising instructions that, when executed by at least one processor, cause a computing device to:
receive, via a processing device of a first requestor device, a first transportation request associated with a first destination;
generate, based on the first transportation request, a digital transportation route that comprises a drop-off location for the first requestor device;
transmit navigational data comprising the digital transportation route to a driver computing device, causing a driver computing device to travel in accordance with the digital transportation route;
during transport of the first requestor device in accordance with the digital transportation route, receive, from a second requestor device, a second transportation request associated with a second destination;
generate, based on the second transportation request, a combined drop-off location for shared transport of both the first requestor device and the second requestor device;
determine that the combined drop-off location is positioned within a first limit of deviation from the first destination for the first requestor device;
determining that the combined drop-off location is positioned within a second limit of deviation from the second destination for the second requestor device;
generating a modified digital transportation route during transport of the first requestor device to include the combined drop-off location instead of the drop-off location based on GPS data indicating a current location of the driver computing device; and
transmit, by the processing device to the driver computing device, navigational data causing the driver computing device to travel according to the modified digital transportation route.

16. The non-transitory computer-readable medium of claim 15, wherein the navigational data comprises historical and current traffic flow information along the modified digital transportation route.

17. The non-transitory computer-readable medium of claim 16, further comprising instructions that, when executed by the at least one processor, cause the computing device to:
identify, based on the first transportation request, that the first limit of deviation comprises a first distance radius relative to the first destination; and
identify, based on the second transportation request, that the second limit of deviation comprises a second distance radius relative to the second destination.

18. The non-transitory computer-readable medium of claim 16, further comprising instructions that, when executed by the at least one processor, cause the computing device to:
identify the first limit of deviation comprises a first walking-time limit of deviation relative to the first destination; and
identify the second limit of deviation comprises a second walking-time limit of deviation relative to the second destination.

19. The non-transitory computer-readable medium of claim 15, further comprising instructions that, when executed by the at least one processor, cause the computing device to:
determine a first transportation fare for shared transport of the first requestor device based on a first distance between the combined drop-off location and the first destination; and determine a second transportation fare for shared transport of the second requestor device based on a second distance between the combined drop-off location and the second destination.

20. The non-transitory computer-readable medium of claim 15, further comprising instructions that, when executed by the at least one processor, cause the computing device to:

provide, for display within a first presentation of a graphical user interface of the first requestor device, the digital transportation route; and subsequently provide, for display within a second presentation of the graphical user interface of the first requestor device, the modified digital transportation route comprising the combined drop-off location.

* * * * *